United States Patent [19]

Nevarez

[11] 4,359,106
[45] Nov. 16, 1982

[54] AGRICULTURAL IMPLEMENT FOR BUILDING IRRIGATION FLOW CHANNELS

[75] Inventor: Enrique F. Nevarez, Gila Bend, Ariz.

[73] Assignee: Paloma Ranch, Div. of Cranco, Gila Bend, Ariz.

[21] Appl. No.: 116,472

[22] Filed: Jan. 29, 1980

[51] Int. Cl.³ .............................. E02F 3/62; E02F 5/22
[52] U.S. Cl. ................................ 172/529; 172/445.1; 172/449
[58] Field of Search ............... 172/528, 529, 530, 143, 172/236, 237, 262, 683, 316, 311, 663, 386, 445.1, 449

[56] References Cited

U.S. PATENT DOCUMENTS

| | | | |
|---|---|---|---|
| 1,419,101 | 6/1922 | Bangle | 172/143 |
| 2,318,562 | 5/1943 | Silver | 172/143 X |
| 3,089,264 | 5/1963 | Davis | 172/143 |
| 3,814,191 | 6/1974 | Tilbury | 172/311 |
| 3,834,466 | 9/1974 | Chandler | 172/235 |
| 4,042,044 | 8/1977 | Honnold | 172/311 |

*Primary Examiner*—Richard J. Johnson
*Attorney, Agent, or Firm*—Gregory J. Nelson

[57] ABSTRACT

The rowbucker apparatus for scraping and extending berm areas adjacent an irrigation ditch. The rowbucker comprises a frame that is towable by a tractor and supports a rotor for rotation. A tramper or trip mechanism is provided to engage the moldboard surfaces of the rotor to arrest rotation. The tramper mechanism includes at least one roller connected to a rockshaft through an arm. The rockshaft may be rotated by a hydraulic actuator to bring the roller in engagement with the moldboard surfaces in a scraping position or to disengage to deposit the scraped up material on the ground establishing a berm when the rotor is released.

4 Claims, 10 Drawing Figures

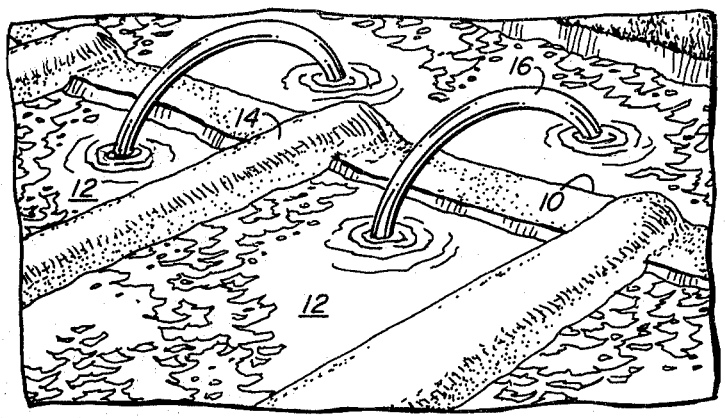
FIG-1
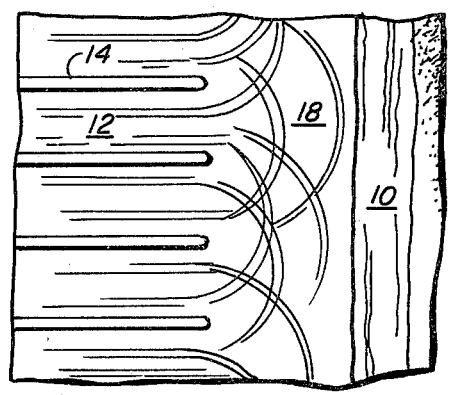
FIG-2
(PRIOR ART)
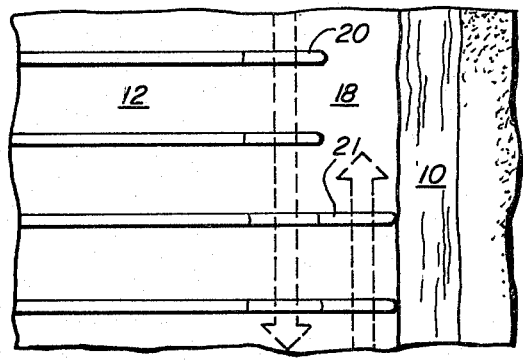
FIG-3A
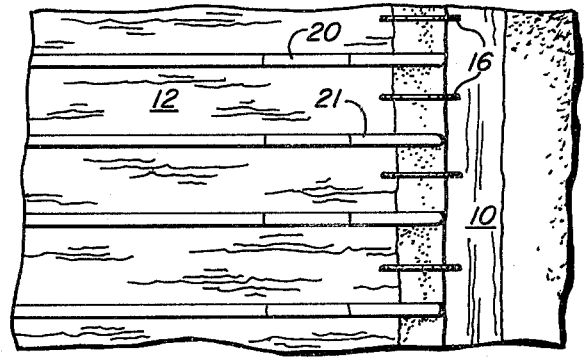
FIG-3B
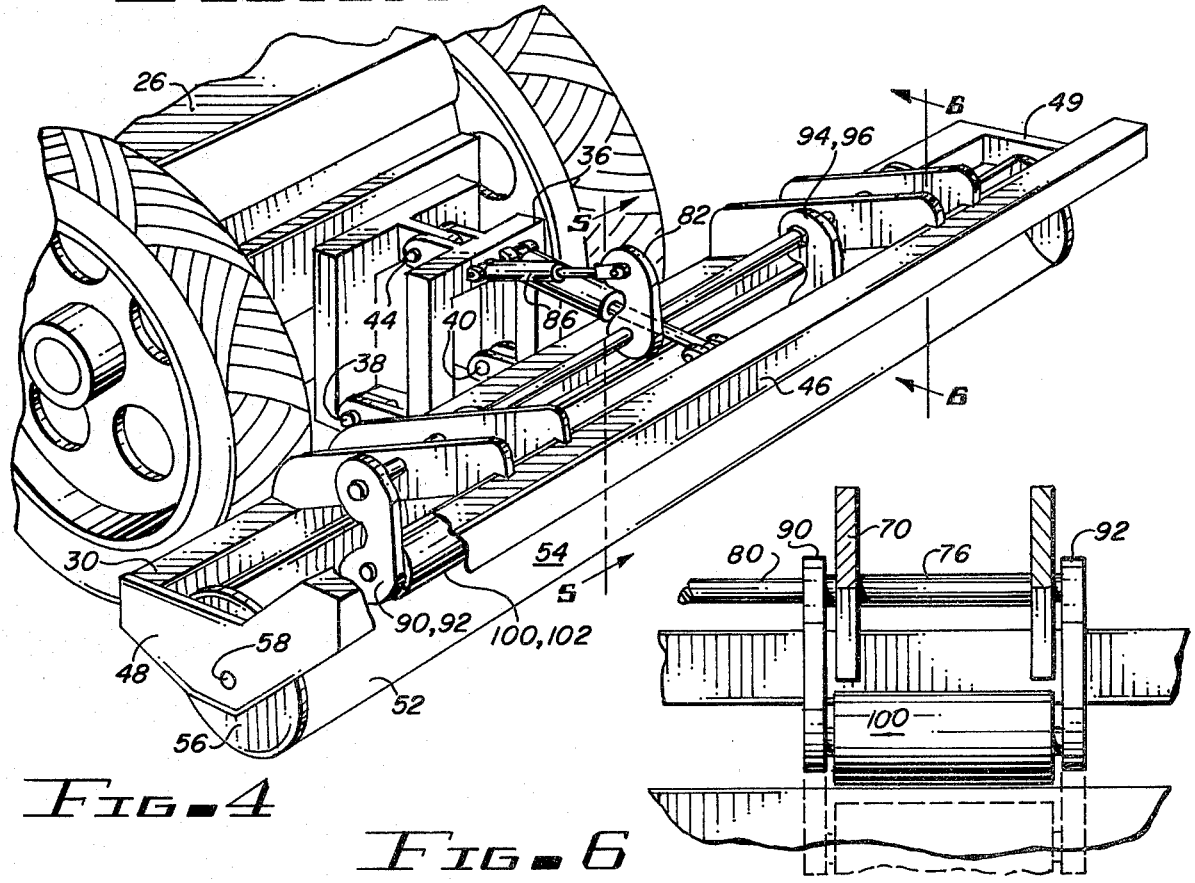
FIG-4
FIG-6

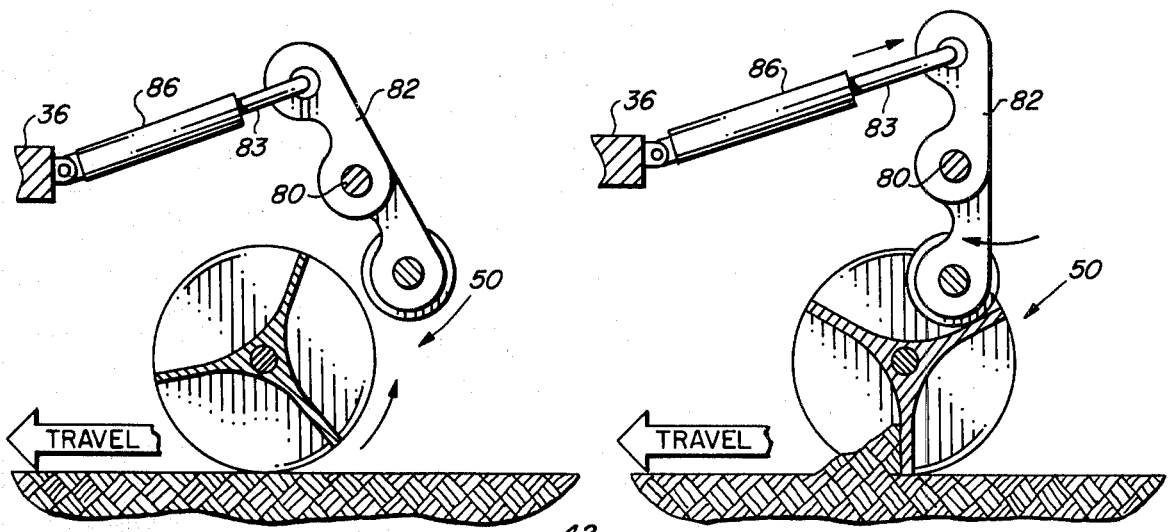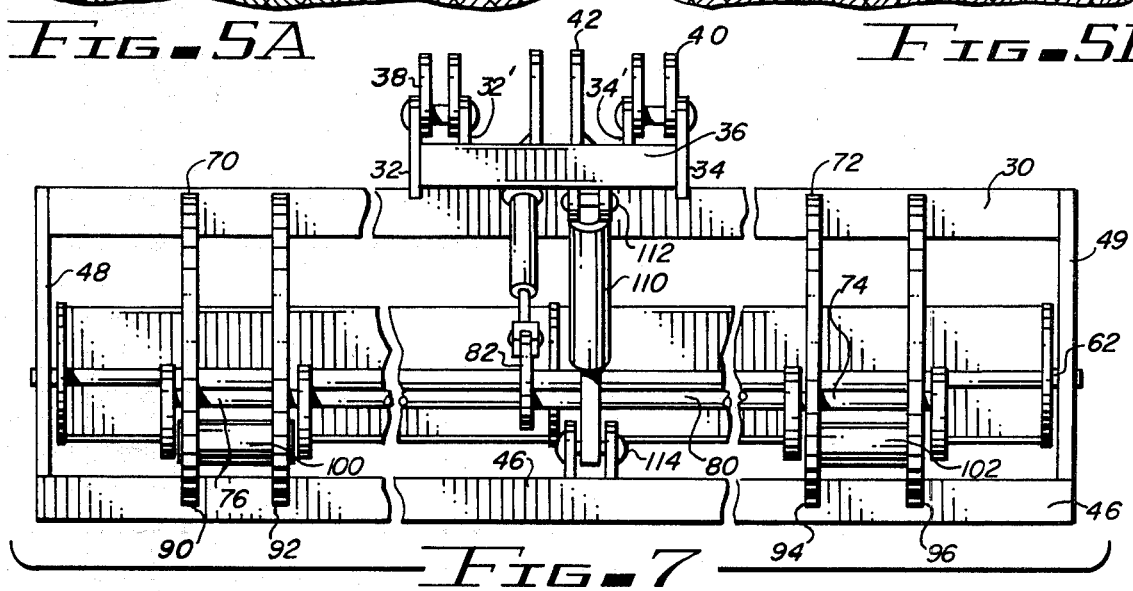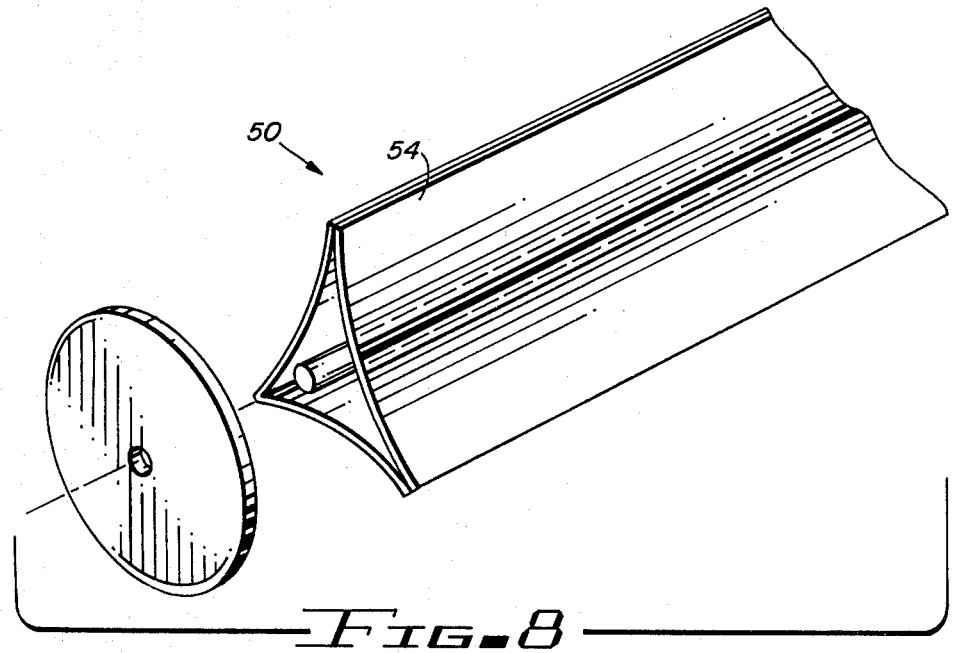

AGRICULTURAL IMPLEMENT FOR BUILDING IRRIGATION FLOW CHANNELS

The present invention relates to an agricultural implement and more particularly relates to an intermittently operable multiple blade scraper apparatus of the type generally designated as a rowbucker or border bucker.

It is common practice in arid agricultural areas, as for example in the Southwestern United States, to supply water to growing crops such as cotton by a system of irrigation. When a field or an area is cultivated, furrows are provided which define channels along which the water flows to provide moisture to the crops generally planted in the adjacent mounds or berms. The berms and the furrows are generally formed normal to the irrigation ditch which delivers water from a main irrigation channel. The ends of the berms and furrows are separated from the irrigation ditch by a border. When a field is to be irrigated, provision must be made to allow the water to flow from the ditch to the furrows. The implement or apparatus commonly used for forming furrows for this purpose is generally designated by farmers as a rowbucker. In the case of furrowed land, water is delivered from the ditch to the furrows by means of siphon tubes.

Similarly, areas of unfurrowed land adjacent the irrigation ditch are also sometimes irrigated. Spaced ridges or berms normal to the ditch are also required to control the flow of water to the field. The device used for establishing furrows in this situation is generally designated a border bucker.

Several scraper implements which may be used for rowbucking or border bucking can be found in the prior art. For example, U.S. Pat. No. 3,089,264 shows a trip mechanism for a rotary multiple blade scraper. The scraper has a multi-edged rotary scraper blade and a trip mechanism which controls the rotation of the blade. An over-center toggle lock and trip mechanism is provided to hold the blade in a locked position. U.S. Pat. No. 3,834,466 shows an apparatus for use in working land adjacent an irrigation ditch. The apparatus comprises a frame in which is rotatably mounted an assembly of spaced blades. Mounted on the frame is a detent which is adapted to engage the upper edge of the blade in the upper most position to hold the assembly against rotation.

While the above apparatus are effective for their intended purpose, there still exists a need in the prior art for an improved apparatus in which a rotatable blade assembly can be controlled with an intermittent motion to form flow channels operating either as a rowbucker or border bucker. Briefly, the present invention provides an agricultural implement of the border bucker or rowbucker type having a frame which rotatably supports an elongated drum defining multiple moldboard surfaces. The frame is adapted to be secured to a prime mover such as a tractor. A shock absorber extends between the hitch and the frame to absorb shocks imparted to the implement. A trip mechanism controls the rotation of the blade to intermittently form furrows at the precise required locations. The trip mechanism includes a transversely extending rockshaft connected to a hydraulic actuator through a link. The ends of the rockshaft are journaled for rotation to the implement frame. The rock shaft carries one or more rollers which depend from the rock shaft on roller supports. Rotation of the rock shaft will bring the rollers into or out of engagement with a moldboard surface of the scraper blades to secure the rotor against movement or permit movement when out of engagement, thereby selectively forming irrigation mounds or berms.

The above and other objects in advantages of the present invention will be more fully appreciated from the following description, claims and drawings in which:

FIG. 1 is a perspective view illustrating a portion of the field adjacent the irrigation ditch;

FIG. 2 is a plan view of a field showing the border area intermediate the furrows and irrigation ditch in which the implement operates to form completed furrows operating as a rowbucker;

FIGS. 3A and 3B illustrate the method in which the implement is operated to complete the furrows in the area adjacent the irrigation ditch;

FIG. 4 is a perspective view of the implement of the present invention;

FIG. 5A is a sectional view along lines 5—5 of FIG. 4 illustrating the roller out of engagement with the scraper;

FIG. 5B is a sectional view along lines 5—5 of FIG. 4 illustrating the roller mechanism in engagement with the scraper blade to secure the blade against rotation.

FIG. 6 is a sectional view taken along lines 6—6 of FIG. 4;

FIG. 7 is a plan view of the implement of the present invention; and

FIG. 8 is an exploded perspective view of a portion of the scraper rotor.

Turning now to the drawings, FIG. 1 shows a portion of an agricultural field provided with water from main irrigation ditch 10. A plurality of parallel, spaced-apart furrows 12 have been formed during the cultivation process extending generally perpendicular or normal to channel 10. The furrows 12 are formed by mounds or berms 14 similarly extending generally perpendicular to the ditch 10. Water is delivered from the irrigation ditch 10 to the furrows 12 by means of generally U-shaped siphon tubes 16 as is common practice in the agricultural industry.

FIG. 2 shows a plan view of a field. When conventionally cultivating the field, berms 14 are formed defining intermediate furrows 12. However, it is necessary that the agricultural implement upon reaching the end of the field make 180° turn in the area generally indicated by the numeral 18. Therefore, the berms 14 terminate at a location short of ditch 10. Obviously, when this piece of land is to be irrigated, provision must be made to allow the water to flow from the ditch 10 into the furrows 12. This is accomplished by a device called a rowbucker in a manner illustrated in FIG. 3A. The rowbucker passes along the border area generally parallel to the irrigation ditch 10 in a path perpendicular to the furrows 12. A rowbucker has a blade assembly which intermittently operates to construct the berm extensions 20. If necessary, the rowbucker can pass along the area 18 in the opposite direction to construct still additional berm extensions 21. When the rowbucking procedure is completed, the field appears as in FIG. 3B and appropriate siphon tubes 16 can be placed in the irrigation ditch to deliver water to the completed furrows 12. Similar operations are often performed around the periphery of non-furrowed fields in a procedure termed "border bucking". The implement of the present invention works equally well for this operation. The device, throughout the specification will be described as a rowbucker, it being understood that the device has application and may be used as a border bucker as well.

The agricultural implement of present invention is shown in FIGS. 4 through 8 and is generally designated by the numeral 25. The implement 25 is adapted to be pulled by any prime mover. A tractor 26 of conventional design is shown for this purpose. The rowbucker 25 of the present invention comprises a frame having a generally transverse front tie bar member 30 which is shown as a channel or box section. A U-shaped frame member is secured to the front tie bar at its approximate mid-point and has spaced apart upstanding legs 32 and 34 and horizontal frame member 36. A pair of spaced-apart hitch plates 38 extend from tie bar 30 forwardly and are pivoted at the outer edge of vertical legs 32, 32'. Similarly, a pair of hitch plate 40 are pivoted to and extend from vertical side plates 34,34' secured to the tie bar 30. Hitch plate members 42 extend forwardly from horizontal frame member 36. Hitch plate members 38, 40 and 42 form a three point hitch connectable to the hitch of prime mover 26 at pins 44 insertable through aligned holes 45 in the hitch plates 38, 40 and 42. Frame 36 is thus movable relative to the plates 32,34.

Rear tie bar 46 extends generally horizontally and is parallel to front tie bar 30 and is positioned at an elevation slightly above front tie bar 30. The front tie bar 30 and the rear tie bar 46 are secured in place by opposite end plates 48 and 49 and welded or otherwise secured at the ends of the tie bars.

As will be explained in greater detail hereafter, the berms and mound and scraping action are imparted by a rotor 50 which is journaled for rotation at opposite side plates 48 and 49. As seen in FIG. 8, rotor 50 consists of a plurality of elongate blades, three being shown spaced at approximately 120°. The blades 52 define a plurality of generally concave moldboard surfaces 54. Circular end plates 56 are secured at opposite ends of rotor 50. End plates 56 have a radius corresponding to the length of blades 52.

A stub shaft 58 projects through the end plates 56 at opposite ends of the rotor and are received in bearings 62 secured at the inner sides of end plate 48. Bearings 62 are preferably heavy duty roller bearings provided with appropriate dirt and dust shields. As the prime mover pulls the rowbucker 25 over the ground surface, material scraped by the blades 52 when the blade is locked accumulates in front of the moldboard surface. The rotor can be selectively released under control of the operator to form mounds or berms of predetermined configuration as established by the moldboard concavity.

In order to intermittently arrest the rotation of the rotor and release the rotor when desired to position the berms or mounds at the desired location, the rowbucker of the present invention is provided with an improved trip or release mechanism.

As illustrated in FIGS. 4, 6 and 7, a pair of cross pieces 70 extend between the front tie bar 30 and the rear tie bar 46 adjacent end plate 48. Similarly, a pair of cross pieces 72 extend between the front tie bar 30 and the rear tie bar 46 adjacent the end plate 49. Sleeve or bushing 74 extends between cross pieces 72. Similarly, a sleeve or bushing 76 extends between cross pieces 70. Bushing 74 and 76 support transversely extending rockshaft 80 for rotation within the respective bushings. Rotation of rockshaft 80 is controlled by arm 82 which is secured to rockshaft 80 at its midpoint. The upper end of arm 82 is received in clevis 84 attached to rod 83 of hydraulic actuator 86. The head end of hydraulic actuator 86 is secured to a mounting bracket 88 at frame member 36. Hydraulic actuator 86 is connected to an appropriate hydraulic control valve which is part of the hydraulic system of the prime mover 26. Details of the hydraulic system such as control valve, pressure reducing valves, pumps and interconnecting fluid lines have not been shown since these are conventional in the art.

The arrest and release of the rotor 50 is controlled by a pair of rollers 100 and 102 which may be either engaged or disengaged from the moldboard surfaces 54. Roller 100 is supported by roller support plates 90 and 92 depending from rockshaft 80 adjacent cross pieces 70. Similarly, roller 102 is supported on rockshaft 80 by depending plates 94 and 96 adjacent cross pieces 72. As will be more fully explained hereafter, rotation of the rockshaft 80 by means of hydraulic actuator 86 will position the rollers 100 and 102 in an engaged or disengaged position to control the rotation of the rotor 50. Extension of hydraulic actuator rod 83 rotates the rockshaft bringing the rollers into engagement with rotor 50 as shown in FIG. 5B. Retraction of rod 83 rotates rockshaft counterclockwise as viewed in FIG. 5A to release the rotor to permit it to freely roll.

A shock absorber 110 extends from a bracket 112 on cross piece 36. The opposite end of shock absorber 110 is secured to bracket 114 at the rear tie bar 46 at a medial location. Shock loadings imparted to the frame are at least partially absorbed at shock absorber 110 to reduce wear and stress imposed on the unit.

A more complete understanding of the present invention will be had from the following description of operation of the implement of the present invention. The device of present invention will be described as a rowbucker to contrast or extend berms in the area indicated by the numeral 18, as shown in FIGS. 2, 3A and 3B. As the rowbucker 25 is pulled along the border, as for example, in the direction of the downward arrow in FIG. 3A, the outer edges of the rotor blades 54 and the circular rotor end plates 56 engage the ground and impart counter clockwise rotation to the rotor as illustrated in FIG. 5A. The rotor will roll freely and any material retained at one of the moldboard surfaces 54 will be formed as a berm 20 as shown in FIG. 5A. When the blade rotor is restrained against rotation during scraping and berm building operations, the hydraulic actuator is pressurized and the rod 83 extended as shown in FIG. 5B. Extension of the rod rotates the rockshaft 80 clockwise through lever 82 as viewed in FIG. 5B. It is preferred that the relationship of the link 82 and rod 83 be established as shown in FIG. 5B so that an approximate right angle is defined therebetween. This results in better operation and reduced side loading on the cylinder. The clockwise rotation of rockshaft 80 will cause rollers 100 and 102 to be pivoted to a position in the path of rotation of the rotor blades as shown in FIG. 5B. One of the blades surfaces will engage the roller 100 and 102 to restrain rotation of the rotor and cause the scraping operation to be initiated at the forward edge of the vertically depending ground engaging blade as shown in FIG. 5B. Scraping can continue until such time as the operator desires to form a mound. The operator will then actuate the hydraulic controls to retract the actuator rod 83 moving the roller stops 100 and 102 out of the path of the rotor blade to permit the roller to rotate and release the material adhead of the vertical blade forming another berm. The operation is continued until berm extension 20 and 21 are completed. Berms may be formed in both directions of operation. Shock loads are at least partially absorbed at shock absorber 110.

A number of significant advantages are available with the rowbucker of the present invention. Hydraulic actuation of the trip mechanism provides quick and efficient control of the rotor. The rotor is engaged by large rollers at several spaced-apart locations along a rotor blade surface which provides positive and smooth control of the roller. Note the diameter of the rollers are substantial compared to the blade. Further, the rollers 100 and 102 are permitted to freely rotate to assist in early and efficiently engaging and disengaging the surfaces of the rotor blades. The three point hitch arrangement is easily and conveniently attachable to conventional prime movers and tractors and along with the shock absorbing member extending transversely across a frame surface to reduce and absorb impact prolonging the affective life of the device. The implement of the present invention can be variously constructed and, as shown, welded steel construction is preferred.

The rowbucker described and disclosed herein constitutes a preferred form of the invention. It will be obvious to those skilled in the art that various changes, modifications and mechanical alterations made the present invention without departing from the spirit and scope of the appended claims and such mechanical arrangements and adaptations are intended to be included herein.

I claim:

1. An agricultural implement for forming mounds or berms of material comprising:

(a) a frame having a hitch attachable to a prime mover;
(b) an elongate rotor mounted for rotation on said frame, said rotor having a plurality of blades defining moldboard surfaces for scraping and forming material;
(c) a rock shaft mounted for rotation on said frame, said rock shaft being generally parallel to said rotor and spaced from said rotor said rock shaft extending substantially coextensive with said rotor;
(d) spaced apart arm means extending from said rock shaft and having at least a pair of longitudinally spaced apart rollers associated therewith;
(e) hydraulic shock absorbing means having a rod end and a cylinder end and extending between said hitch and frame to absorb shock loading imposed thereon; and
(f) hydraulic actuating means for selectively rotating said rock shaft from a first position with said rollers engaging one of said rotor blades to arrest rotation of the rotor to a second position with said rollers out of engagement with the rotor thereby permitting rotation of the rotor.

2. The implement of claim 1 wherein multiple rollers are provided at spaced-apart locations along said rockshaft.

3. The implement of claim 1 wherein said rotor includes a pair of oppositely disposed circular end plates having elongate blades extending generally radially therebetween defining moldboard surfaces, said blades extending to approximately the peripheral edge of said end plates.

4. The implement of claim 1 wherein a three point hitch is secured to said frame.

* * * * *